L. S. HACKNEY.
MOTOR PLOW.
APPLICATION FILED FEB. 4, 1911.
1,069,002.
Patented July 29, 1913.
5 SHEETS—SHEET 5.
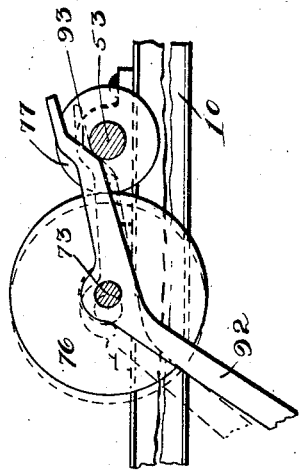
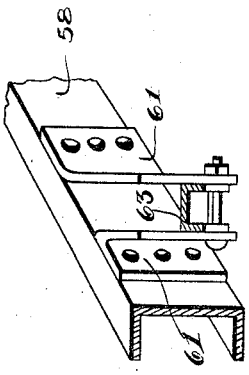
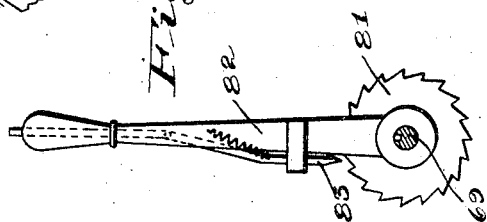
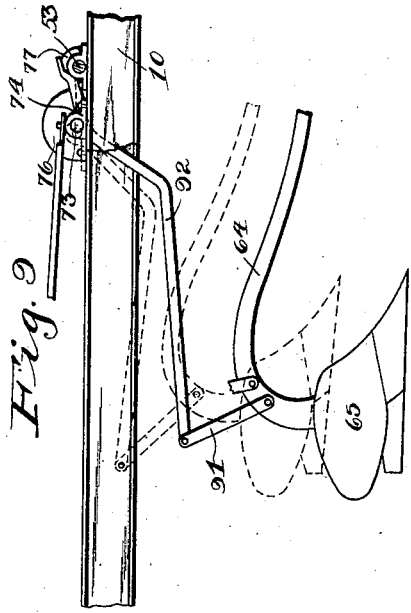
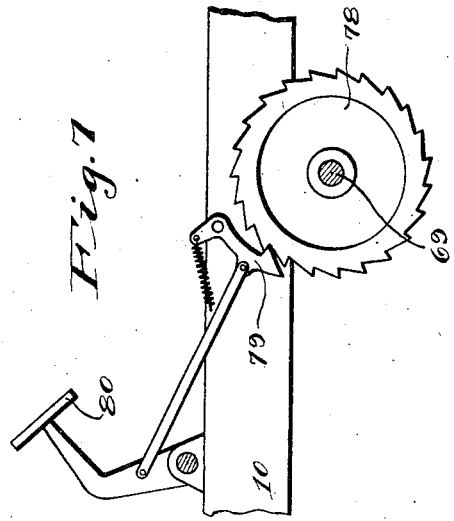
Witnesses
F. C. Caswell
W. H. Williams
Inventor
Leslie S. Hackney
by John E. Stephen Atty.

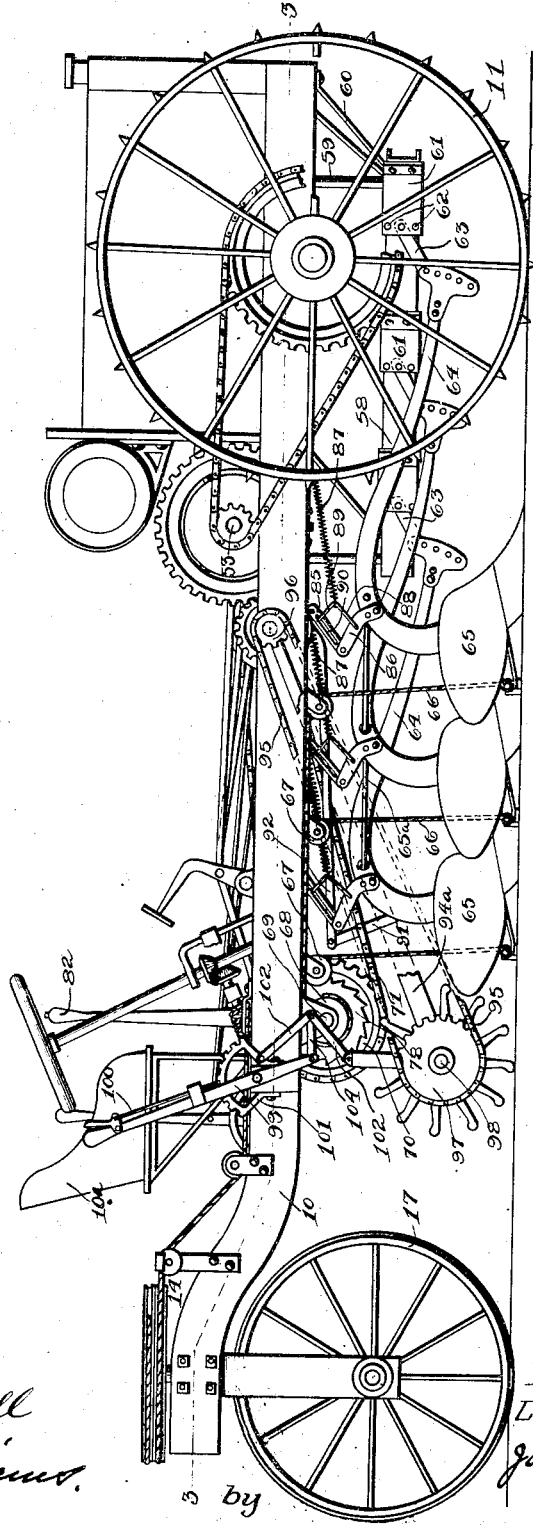

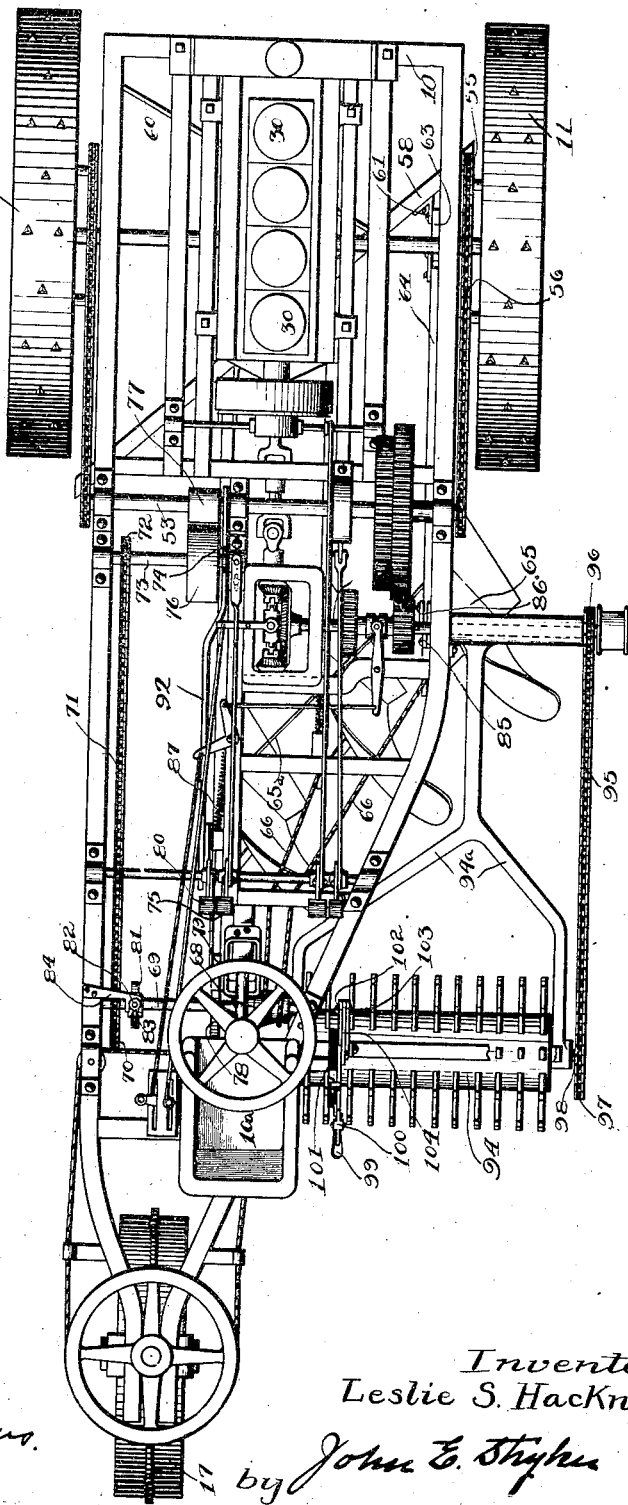

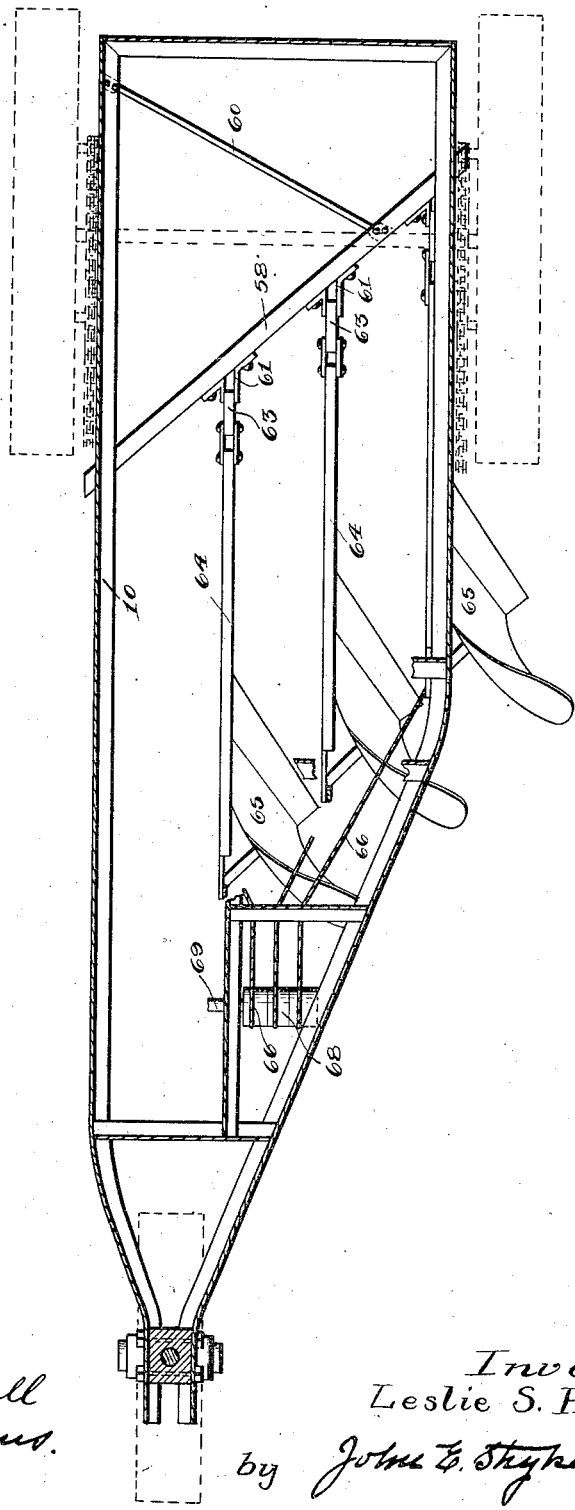

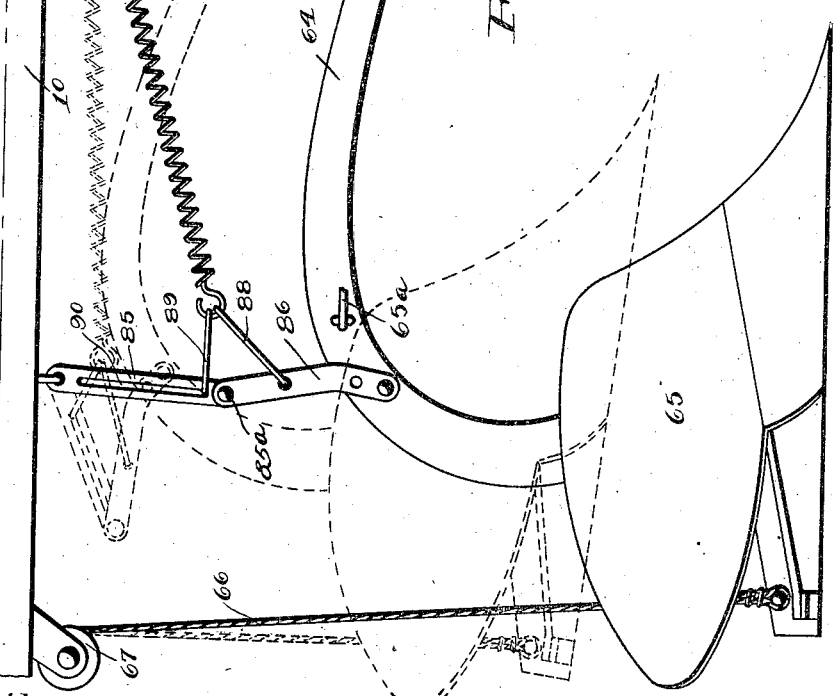

UNITED STATES PATENT OFFICE.

LESLIE S. HACKNEY, OF ST. PAUL, MINNESOTA.

MOTOR-PLOW.

1,069,002.  Specification of Letters Patent.  Patented July 29, 1913.

Application filed February 4, 1911. Serial No. 606,524.

*To all whom it may concern:*

Be it known that I, LESLIE S. HACKNEY, a citizen of the United States, residing at St. Paul, in the county of Ramsey and State of Minnesota, have invented new and useful Improvements in Motor-Plows, of which the following is a specification.

My invention relates to improvements in motor plows.

The object of my invention is to provide a motor plow simple and durable in construction and arranged with its plow and motor control within easy access and view of a single operator.

A further object of my invention is to provide such an implement having its plows flexibly attached to the frame, between its supporting wheels and in full view of the operator.

A further object of my invention is to provide a motor plow having shares adjusted vertically by power, and provided with means for yieldingly holding said shares in their operative positions.

Figure 1 is a side elevation of my improved motor plow; Fig. 2 is a plan view of the same with the hood and dash removed; Fig. 3 is a sectional view taken on the line 3—3 of Fig. 1 showing the plow hitch and draw bar connection; Fig. 4 is a side elevation in detail of the means for yieldingly holding the plows in their operative positions; Fig. 5 is an end elevation of the same; Fig. 6 is a detail of the link connection between the plow beams and draw bar; Fig. 7 is a detail view of the plow releasing mechanism; Fig. 8 shows the hand operating device for raising the plows; Fig. 9 is a detail in side elevation of the safety stop and plow connection and Fig. 10 is an enlarged side view of the stop.

Referring to the accompanying drawings the reference numeral 10 indicates the main frame. This frame is supported at its forward end by the traction wheels 11 journaled thereon and at its rear by the steering wheel 17. The motor 30 is in operative connection with the power shaft 53 on the frame 10.

The draw bar 58 is suspended from the main frame 10 by the rods 59 and is braced by the bars 60 which extend between the frame and said bar. Pairs of plates 61 are fixed to the draw bar 58 and are provided with perforations 62. The channeled links 63 are connected to said plate at one end by bolts in a pair of perforations 62 and are connected at their other ends to the plow beams 64. The links above described fit closely between the plates 61 and the forked ends of the plow beams 64. This construction prevents lateral movement of said beams and provides flexible connections, accommodating themselves to uneven motions between the plow beams 64 and the main frame 10. The rods $65^a$ pivotally connected to the plow beams 64 hold the plows at a fixed distance apart from each other.

The gang of plows 65 is operated vertically as follows: Each of the cables 66 is fixed to one of the plows 65 and extends through one of the guide pulleys 67 to the drum 68 on the shaft 69. Said shaft 69 is driven by the sprocket wheel 70 which in turn is connected through the chain 71 with the sprocket wheel 72 on the counter shaft 73. The counter shaft bearing 74 is slidably mounted on the main frame 10 and is connected with the pedal 75 which moves said bearing forward to engage the friction pulley 76 on the counter shaft 73 with the friction drive pulley 77 on the shaft 53. The engagement of the pulley 76 with the drive pulley 77 causes the drum 68 to rotate, thus winding up the cables 66 and elevating the plows 65. The ratchet wheel 78 on the shaft 69 is engaged by the spring actuated pawl 79. Said pawl normally prevents the rotation of said shaft 69 in a direction to lower the plows. The plows are lowered by gravity when the pawl 79 is released from engagement with the ratchet wheel 78 by its operating pedal 80.

Means for manually raising the plows are provided as follows: The ratchet wheel 81 is feathered on the shaft 69 and is operated by the lever 82 in a direction to wind the cables 66 for raising the plows; said lever being provided with the hand operated pawl 83 to engage said ratchet wheel 81. The support 84 is fixed to the main frame 10 and is adapted to form a rest for the lever 82 when said lever is not in use.

The operating levers, pedals and hand wheels above described are conveniently grouped in positions to the rear of the plows and are easily accessible from the driver's seat 10ª from which a full view of the plow and operating parts is obtained.

I have provided for holding each of the plows in their operative positions, a yielding support comprising the upper member 85, the lower members 86 and the adjustable spring 87. The members 85 and 86 are pivotally connected by the bolt 85ª one end of the member 85 being pivotally attached to the main frame 10, and the opposite ends of the members 86 being pivotally connected to the plow beams 64. The spring 87 is adjustably attached at one end to the main frame 10 and at the other to said members 86 by a link 88 and to said member 85 by a link 89, said last mentioned link being slidably mounted in the slot 90. When the plows are in their operative positions as shown in Fig. 4 of the drawings, the supporting members 85 and 86 are extended, the centers of their pivotal connections being approximately but not exactly in vertical alinement. The link 89 rests at the bottom of the slot 90 near the connection between the said supporting members, thus bringing the spring and support connection to a position where the maximum downward pressure on the plows is secured. Elevating the plows, either by inequalities in the surface of the earth or by the plow lift, breaks the support to the rear, against the action of the spring 87, as shown in dotted lines in Fig. 4 of the drawings. When the plows are in their elevated or inoperative positions, the members 85 and 86 are folded, said link 89 resting in the slot 90 at the upper end of the member 85 near the frame connection. This position of the spring connection relieves the tension on the spring 87 and results in a minimum downward pressure on the plows.

The safety stop for limiting the upward movement of the plows is arranged as follows: The bar 91 is pivotally connected at one end to the plow beams 64 and at the other end to the bar 92, which is pivotally mounted on the shaft 73 at a point near one end of said bar, as shown in Figs. 9 and 10. The free end of the bar 92 is beveled at 93 and engages the shaft 53 as the plows are raised. The engagement of said beveled edge with the stationary shaft 53 moves the counter shaft 73 toward the rear and disengages the friction pulleys 76 and 77 against the pressure on the pedal 75 which is brought to bear by the operator in raising the plows. The disengagement of the friction pulleys 76 and 77 stops the winding of the cables 66 by the drum 68, said drum being held from rotation to unwind the cables by the ratchet 78. The downward movement of the plows is limited by the cables 66, whose attachment to the drum 68 is varied according to the desired working depth of the plows. The pulverizer 94 is rotatably mounted between the forks 94ª, said forks being pivotally mounted on the shaft 38 to permit vertical adjustment of said pulverizer. The chain 95 connects the sprocket wheel 96 on the shaft 38 and the sprocket wheel 97 on the pulverizer shaft 98 and rotates the same. The lever 99 is provided with a hand operated pawl 100 and a sector 101 and adjusts the pulverizer vertically through the links 102, 103 and 104 as shown in Fig. 1 of the drawings.

In operation the plows are raised from the ground by pressing the pedal 75, which causes the drum 68 to rotate and wind up the cables 66. The plows are stopped in their upward movement by the disengagement of the pulleys 76 and 77 and are released and lowered from their elevated position by operating the pedal 80.

Having described my invention, what I claim as new and desire to protect by Letters Patent, is:

1. In a plow of the class described, the combination of a frame, supporting wheels therefor, plow beams carrying plows beneath said frame and folding supports between said frame and beams, said supports comprising upper and lower pivoted members and springs, each attached to the frame at one end and provided at the other with a link slidable in one of said upper members and with a second link pivoted in one of said lower members.

2. In a plow of the class described, the combination of a frame, supporting wheels therefor, a draw bar carried by said frame, plows connected with said draw bar, plows carried by said beams, jointed plow supports between the frame and beams, a coiled spring attached to the frame at one end and at the other provided with links connected respectively to the upper and lower members of the support whereby said support is held in extended position, and means for lifting the plows and thereby folding said support against the tension of the spring.

3. In a plow of the class described the combination of a frame, supporting wheels journaled thereon, a draw bar carried by said frame, plow beams carrying plows connected to the draw bar, yielding supports for holding each of the plows in operative position, each comprising a slotted upper supporting member pivotally connected at one end to the main frame, lower supporting members each pivotally connected at one of its ends to a plow beam and at its other end to the first mentioned member, a spring adjustably attached to the frame at one end, a link connected at one end to said spring and at the other to one of the supporting members and a second link connected at one end to the spring and slidably mounted at the other end in one of said supporting members.

In testimony whereof, I have signed my name to this specification in the presence of two subscribing witnesses.

LESLIE S. HACKNEY.

Witnesses:
NINA L. BABCOCK,
B. C. STRANG.